United States Patent
Lin et al.

(10) Patent No.: US 8,648,831 B2
(45) Date of Patent: Feb. 11, 2014

(54) TOUCH POSITION DETECTION APPARATUS AND METHOD USING MULTISTAGE SCAN

(71) Applicant: Yen-Hung Tu, Taipei (TW)

(72) Inventors: Ar-Jann Lin, Zhongli (TW); Wen-Chieh Pan, New Taipei (TW);

(73) Assignee: Yen-Hung Tu, Taipei (TW)

( * ) Notice: Subject to any disclaimer, the term of this patent is extended or adjusted under 35 U.S.C. 154(b) by 0 days.

(21) Appl. No.: 13/906,149

(22) Filed: May 30, 2013

(65) Prior Publication Data

US 2013/0257779 A1 Oct. 3, 2013

Related U.S. Application Data

(62) Division of application No. 13/149,007, filed on May 31, 2011.

(30) Foreign Application Priority Data

Dec. 24, 2010 (TW) ................................. 99145770 A

(51) Int. Cl.
G06F 3/041 (2006.01)

(52) U.S. Cl.
USPC ...... 345/173; 345/174; 178/18.01; 340/407.1

(58) Field of Classification Search
USPC ............. 345/173, 174; 178/18.01; 340/407.1
See application file for complete search history.

(56) References Cited

U.S. PATENT DOCUMENTS

2011/0134067 A1* 6/2011 Joguet et al. ................... 345/173
2013/0100071 A1* 4/2013 Wright et al. .................. 345/174

* cited by examiner

*Primary Examiner* — Lixi C Simpson

(74) *Attorney, Agent, or Firm* — Shimokaji & Associates P.C.

(57) ABSTRACT

A touch position detection apparatus and method using multistage scan, the apparatus including: a scan lines connection circuit, used to control the connection configuration between a first group of scan lines and a second group of scan lines, to form an equivalent resolution distribution of a sensor device, wherein the second group of scan lines are coupled with the sensor device; a touch scan unit, used to select a portion of the first group of scan lines to detect an interim touch coordinate; and a touch coordinate decision unit, having a plurality of operation stages, used to control the scan lines connection circuit and the touch scan unit according to the operation stages, and sum up a plurality of the interim coordinates detected in the operation stages.

9 Claims, 4 Drawing Sheets

TOUCH POSITION DETECTION APPARATUS AND METHOD USING MULTISTAGE SCAN

CROSS REFERENCE TO RELATED APPLICATIONS

This application is a divisional application of pending U.S. patent application Ser. No. 13/149,007, filed on May 31, 2011, the contents of which are herein incorporated by reference.

BACKGROUND OF THE INVENTION

1. Field of the Invention

The present invention relates to an apparatus and method for a touch display module, especially to a touch position detection apparatus and method using multistage scan for a touch display module.

2. Description of the Related Art

As is well known, a common touch display module scans an X-Y array with a fixed frequency—for example, selecting one from a plurality of Y scan lines in turn to connect to a power supply, and selecting one from a plurality of X scan lines in turn to receive an analog sensor signal—to detect a touch position. However, when the size of the touch display module is large, that is, when the number of Y scan lines and X scan lines is large, the traditional X-Y array scan method proves inefficient—the number of pins of related control IC increases phenomenally, and the display picture of the touch display module is subject to the interference of the fixed frequency touch scan.

To solve the mentioned problems of the touch display module, the present invention proposes a novel touch position detection mechanism, which utilizes a multistage scan methodology to detect a touch position.

SUMMARY OF THE INVENTION

One objective of the present invention is to disclose a touch position detection apparatus using multistage scan, to increase the touch position detection efficiency, lower the operation power consumption, decrease the number of pins of the control IC, reduce electromagnetic interference, and prevent interfering the display picture.

Another objective of the present invention is to disclose a touch position detection method using multistage scan, to increase the touch position detection efficiency, lower the operation power consumption, decrease the number of pins of the control IC, reduce electromagnetic interference, and prevent interfering the display picture.

To attain the foregoing objectives, a touch position detection apparatus using multistage scan is disclosed, the apparatus including a scan lines connection circuit, a touch scan unit, and a touch coordinate decision unit.

The scan lines connection circuit is used to control the connection configuration between a first group of scan lines and a second group of scan lines according to a scan lines connection control signal, to form an equivalent resolution distribution of a sensor device, wherein the second group of scan lines is coupled with the sensor device.

The touch scan unit is used to select a portion of the first group of scan lines according to a resolution programming signal to detect an interim touch coordinate, and deliver the interim touch coordinate through a first coordinate signal.

The touch coordinate decision unit has a plurality of operation stages, and is used to: determine the status of the scan lines connection control signal and the status of the resolution programming signal according to the operation stages; receive a plurality of the interim touch coordinates detected in the operation stages through the first coordinate signal; and sum up the interim coordinates.

To attain the foregoing objectives, another touch position detection apparatus using multistage scan is proposed, the apparatus including a scan lines combination circuit, a scan lines connection circuit, a touch scan unit, and a touch coordinate decision unit.

The scan lines combination circuit is used to select a portion of a third group of scan lines to connect with a second group of scan lines according to a scan lines combination circuit control signal, to locate a touched sub area of a sensor device, wherein the third group of scan lines is coupled with the sensor device.

The scan lines connection circuit is used to control the connection configuration between a first group of scan lines and the second group of scan lines according to a scan lines connection control signal, to form an equivalent resolution distribution of the touched sub area.

The touch scan unit is used to select a portion of the first group of scan lines to detect an interim touch coordinate, and deliver the interim touch coordinate through a first coordinate signal.

The touch coordinate decision unit has a scan lines combination circuit operation stage and a sub area scan stage, wherein the sub area scan stage has a plurality of operation stages. The touch coordinate decision unit is used to: determine the status of the scan lines combination circuit control signal and derive a touched sub area coordinate when in the scan lines combination circuit operation stage; determine the status of the scan lines connection control signal and the status of the resolution programming signal, and receive a plurality of the interim touch coordinates from the first coordinate signal according to the operation stages when in the sub area scan stage; and sum up the touched sub area coordinate and the interim coordinates.

To attain the foregoing objectives, a touch position detection method using multistage scan is proposed, the method including the following steps:

Detect a first coordinate of a touch event of a sensor device with a first equivalent resolution distribution (step a).

Detect a second coordinate of the touch event of the sensor device with a second equivalent resolution distribution (step b).

Sum up the first coordinate and the second coordinate (step c).

To attain the foregoing objectives, another touch position detection method using multistage scan is proposed, the method including the following steps:

Scan a sensor device to find a touched sub area from a set of sub areas of the sensor device, wherein the touched sub area has a sub area coordinate (step a).

Detect a first coordinate of a touch event of the touched sub area with a first equivalent resolution distribution (step b).

Detect a second coordinate of the touch event of the touched sub area with a second equivalent resolution distribution (step c).

Sum up the sub area coordinate, the first coordinate, and the second coordinate.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 2(a)~2(b) illustrate the concept of coordinates decomposition of the present invention.

DETAILED DESCRIPTION OF THE PREFERRED EMBODIMENTS

The present invention will be described in more detail hereinafter with reference to the accompanying drawings that show the preferred embodiment of the invention.

Figure 1C:
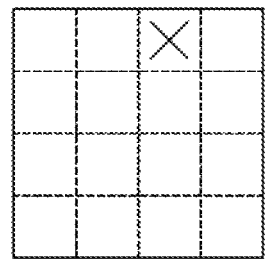
FIG. 1(a)~1(c) illustrate the detection of a touch position on a touch display module using the multistage scan of the present invention.
Figure 1B:
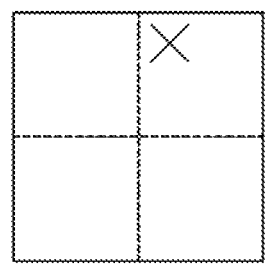
Figure 1A:
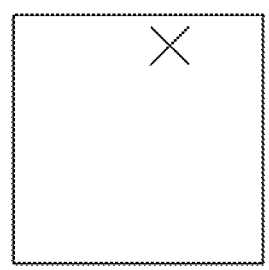

Please refer to FIG. 1(a)~1(c), which illustrate the detection of a touch position on a touch display module using the multistage scan of the present invention. FIG. 1(a) represents stage 1: performing touch detection by viewing the touch display module as a touch plane having a resolution of 1×1. FIG. 1(b) represents stage 2: performing touch detection by viewing the touch display module as a touch plane having a resolution of 2×2. FIG. 1(c) represents stage 3: performing touch detection by viewing the touch display module as a touch plane composed of four sub touch planes each having a resolution of 2×2, wherein, the symbol X in the figures indicates a touch event. When the touch event occurs, it is first detected in the stage 1, and then a first coordinate is generated in the stage 2, and then a second coordinate is generated in the stage 3, and the touch position of the touch event can be determined by summing up the first coordinate and the second coordinate.

Figures 2A, 2B:
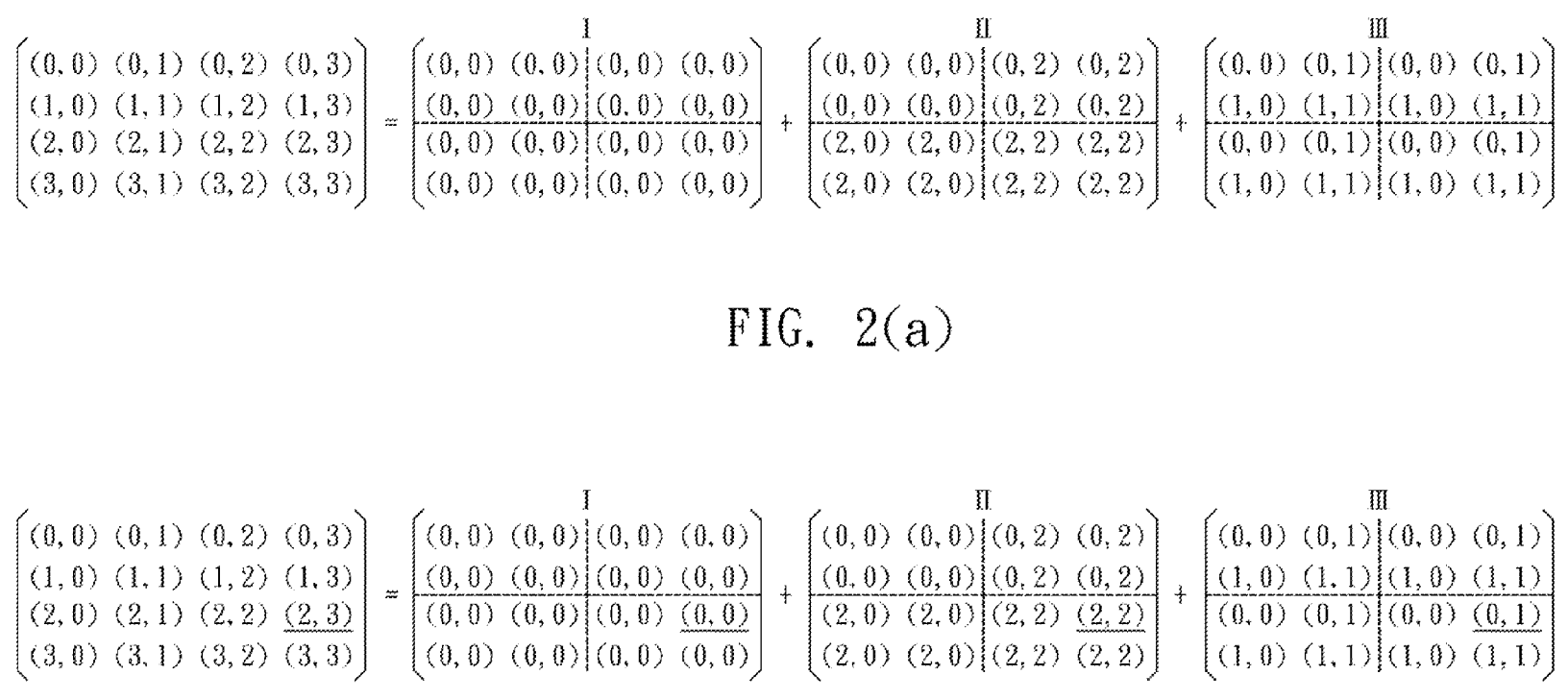

The foregoing concept of coordinates decomposition can be further illustrated using FIG. 2(a)~2(b). As illustrated in FIG. 2(a), the coordinates matrix can be decomposed into three matrixes, wherein the first matrix, of which each coordinate element is equal to (0,0), represents the coordinate space of the stage 1; the second matrix, of which the left top sub matrix is composed of four identical elements—(0,0), (0,0), (0,0), (0,0), the right top sub matrix is composed of four identical elements—(0,2), (0,2), (0,2), (0,2), the left bottom sub matrix is composed of four identical elements—(2,0), (2,0), (2,0), (2,0), and the right bottom sub matrix is composed of four identical elements—(2,2), (2,2), (2,2), (2,2), represents the coordinate space of the stage 2; and the third matrix, of which the left top sub matrix, the right top sub matrix, the left bottom sub matrix, and the right bottom sub matrix are all composed of four different elements—(0,0), (0,1), (1,0), (1,1), represents the coordinate space of the stage 3.

The first matrix corresponds to FIG. 1(a), i.e., the touch plane having an equivalent resolution of 1×1 is represented by having all elements equal to (0,0). The second matrix corresponds to FIG. 1(b), i.e., the touch plane having an equivalent resolution of 2×2 is represented by having all elements in the left top sub matrix equal to (0,0), all elements in the right top sub matrix equal to (0,2), all elements in the left bottom sub matrix equal to (2,0), and all elements in the right bottom sub matrix equal to (2,2). The third matrix corresponds to FIG. 1(c), i.e., the touch plane composed of four sub touch planes each having an equivalent resolution of 2×2 is represented by four identical sub matrixes each composed of four different elements—(0,0), (0,1), (1,0), (1,1).

In FIG. 2(b), the underlined coordinates—(2,3), (0,0), (2,2), (0,1)—corresponding to the symbol X depicted in FIG. 1(a)-1(c), have a relation equation among them: (2,3)=(2,2)+(0,1). That is, when the touch event X is detected with an equivalent resolution of 1×1 in stage 1, a coordinate of (0,0) is generated; and a coordinate of (2,2) corresponding to X is generated in stage 2 by scanning the touch plane with an equivalent resolution of 2×2; and then a coordinate of (0,1) corresponding to X is generated in stage 3 by scanning the sub touch plane detected in stage 2 with an equivalent resolution of 2×2, and the touch coordinate (2,3) is determined by summing up (2,2) and (0,1).

For general case, a coordinate matrix $M_{JK}$ has a resolution of J×K, wherein J, K are positive integers. If J is resolved as $J=N_1 \times N_2$, and K is resolved as $K=L_1 \times L_2$, then the resolution can be expressed as $N_1 \times N_2 \times L_1 \times L_2 = (1 \times 1) \times (N_1 \times L_1) \times (N_2 \times L_2)$, wherein $N_1, N_2, L_1, L_2$ are positive integers. By sequentially using 1×1 resolution for the touch plane in stage 1, $N_1 \times L_1$ resolution for the touch plane in stage 2, and $N_2 \times L_2$ resolution for a sub touch plane—which is located in stage 2—in stage 3, coordinates of (0,0), $(x_1, y_1)$, and $(x_2, y_2)$ are generated respectively, and any element (x,y) of the coordinate matrix $M_{JK}$ can be expressed by:

$$x=N_2 x_1 + x_2, y=L_2 y_1 + y_2, \text{wherein}, 0 \leq x \leq J-1, 0 \leq y \leq K-1,$$
$$0 \leq x_1 \leq N_1-1, 0 \leq y_1 \leq L_1-1, 0 \leq x_2 \leq N_2-1, 0 \leq y_2 \leq L_2-1.$$

Taking the most right bottom coordinate (J−1,K−1) of the matrix $M_{JK}$ for example, the corresponding $(x_1, y_1)$ is equal to $(N_1-1, L_1-1)$, the corresponding $(x_2, y_2)$ is equal to $(N_2-1, L_2-1)$, and it can be shown that $N_2 x_1 + x_2 = N_2(N_1-1) + N_2-1 = N_1 N_2-1 = J-1$, and $L_2 y_1 + y_2 = L_2(L_1-1) + L_2-1 = L_1 L_2-1 = K-1$.

Besides, when J, K are much larger than 1, the average detection times of the three-stage scan will be much less than that of the scan using J×K resolution. The proof is as follows:

The average detection times of the scan using J×K resolution is equal to $(1+2+3+ \ldots +JK)/JK=(1+JK)/2=(1+N_1 L_1 N_2 L_2)/2$, while the average detection times of the three-stage scan is equal to $1+N_1 L_1/2+N_2 L_2/2=(2+N_1 L_1+N_2 L_2)/2$. When J, K are both much larger than 1, $(2+N_1 L_1+N_2 L_2)/2$ is much smaller than $(1+N_1 L_1 N_2 L_2)/2$. Taking $N_1=4$, $L_1=5$, $N_2=5$, $L_2=3$ for example, $(2+N_1 L_1+N_2 L_2)/2=37/2$ is much smaller than $(1+N_1 L_1 N_2 L_2)/2=301/2$.

Further, as is known that given a×b=k, wherein a>0, b>0, and k is a constant, (a+b) is minimized when a=b, therefore, it is preferable to make $(N_1 \times L_1)$ as close to $(N_2 \times L_2)$ as possible, so as to minimize the average detection times.

Based on the foregoing principle, the present invention can also be used in multi-touch applications. Taking two touch positions at a time for example, two touch coordinates: $(x(1), y(1))=(N_2 x_1(1)+x_2(1), L_2 y_1(1)+y_2(1))$ and $(x(2), y(2))=(N_2 x_1(2)+x_2(2), L_2 y_1(2)+y_2(2))$ are generated respectively.

Besides, the present invention can also define the equivalent resolution distribution of a sensor device as a non-uniform distribution. For example, when in the stage 3, the present invention can define the sub touch plane located in the stage 2 as having equivalent resolution of $N_2 \times L_2$, while make other sub touch planes not located in the stage 2 as having equivalent resolution of $N_1 \times L_1-1$, or 1×1, or even as being no scan operation areas or power-shutdown areas. What is more, the number of stages of the present invention can be adjusted according to need. The number of stages can be increased when the present invention is applied to a large touch display module, and be reduced when the present invention is applied to a small touch display module.

What is more, the present invention possesses expandable characteristic, which makes it especially suitable for large size touch applications. The reason is as follows:

If an existed J×K scan module of the present invention is added with a scan lines combination circuit, which can connect the existed J×K scan module to four J×K sub touch planes sequentially, then the touch plane can be expanded from J×K to 2J×2K. The scan operation can be divided into: stage 1—for generating a coordinates space of {(0,0),(0,K), (J,0),(J,K)}, stage 2—for generating a coordinates space of {(0,0), . . . (J−1,K−1)}, and stage 3—for summing up a coordinate generated in the stage 1 and a coordinate generated in stage 2 to generate a touch coordinate of the 2J×2K touch plane having a coordinates space of {(0,0), . . . (2J−1, 2K−1)}. Taking the most right bottom position of the 2J×2K touch plane for example, the coordinate generated in the stage 1 is (J,K), the coordinate generated in the stage 2 is (J−1,K−1), and (J,K)+(J−1,K−1)=(2J−1,2K−1) which is indeed the coordinate of the most right bottom position of the 2J×2K touch plane.

Figure 3:
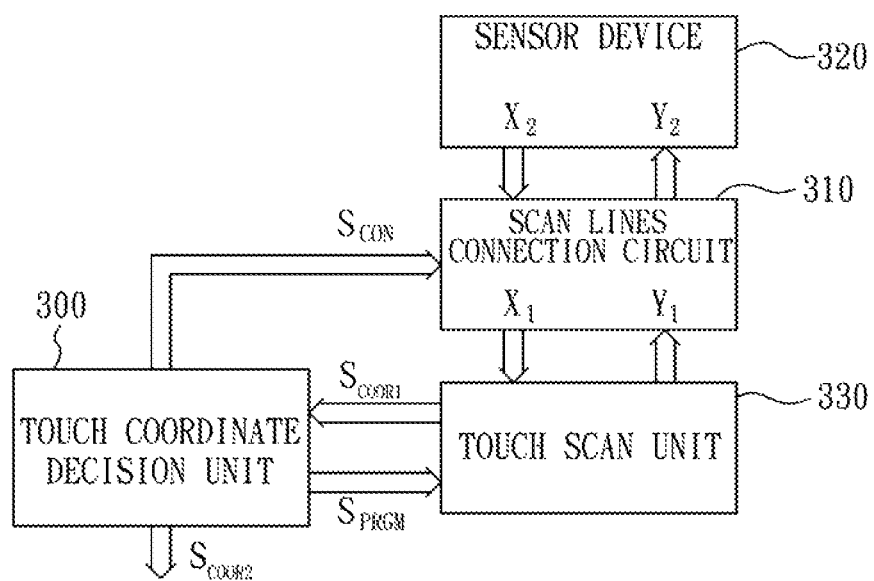
FIG. 3 illustrates the circuit block diagram of a preferred embodiment of the multistage scan touch position detection apparatus of the present invention.

According to the foregoing specification, the present invention proposes a preferred embodiment, of which the circuit block diagram is illustrated in FIG. 3. As illustrated in FIG. 3, the preferred embodiment includes a touch coordinate decision unit 300, a scan lines connection circuit 310, a sensor device 320, and a touch scan unit 330.

The touch coordinate decision unit 300, having a plurality of operation stages, is used to: control the scan lines connection circuit 310 through a scan lines connection control signal $S_{CON}$, to define equivalent resolution distributions of the operation stages; determine the coordinate spaces of the touch scan unit 330 in the operation stages by a resolution programming signal $S_{PRGM}$; receive interim touch coordinates generated by the touch scan unit 330 in the operation stages by a first coordinate signal $S_{COOR1}$; and sum up the interim touch coordinates to form a touch coordinate and output the touch coordinate through a second coordinate signal $S_{COOR2}$.

The scan lines connection circuit 310 is used to form a plurality of connection configurations between scan lines $X_2$ and scan lines $X_1$, and between scan lines $Y_2$ and scan lines $Y_1$, so as to define the equivalent resolution distributions of the sensor device 320 for the operation stages—for example, as mentioned above, the equivalent resolution distributions can be one scan space of (1×1) for the stage 1, one scan space of ($N_1 \times L_1$) for the stage 2, and $N_1 L_1$ scan spaces of ($N_2 \times L_2$) for the stage 3. Besides, the present invention can also define the equivalent resolution distribution of the sensor device 320 as a non-uniform distribution. For example, when in the stage 3, the present invention can define the sub touch plane located in the stage 2 as having equivalent resolution of $N_2 \times L_2$, while make other sub touch planes not located in the stage 2 as having equivalent resolution of $N_1 \times L_1 - 1$, or 1×1, or even as being no scan operation areas or power-shutdown areas.

The sensor device 320 is an array type touch sensor device, which can be of resistive type, capacitive type, surface acoustic wave type, or electromagnetic type. The sensor device 320 preferably accesses a driving power through the scan lines $Y_2$ and outputs an analog sensor signal through the scan lines $X_2$. As the sensing principle of the array type touch sensor device is well known and not the focus of the present invention, it will not be addressed further.

The touch scan unit 330 is used to determine the coordinate spaces of the operation stages according to the resolution programming signal $S_{PRGM}$, so as to deliver the driving power through part of the scan lines $Y_1$, and receive the analog sensor signal through part of the scan lines $X_1$. The analog sensor signal is converted to a digital signal by an analog-to-digital converter (not shown in the figure), and the digital signal is then used to generate the interim touch coordinates. After the interim touch coordinates are generated, the touch scan unit 330 will output the interim touch coordinates through the first coordinate signal $S_{COOR1}$. Besides, thanks to the multistage scan, the touch scan unit 330 can offer a frequency-hopping option—having different scan frequencies for different operation stages—to reduce operation power consumption and electromagnetic interference, and to prevent interfering the display operation by having the scan frequencies shy away from other fixed frequencies of the display module.

Figure 4:
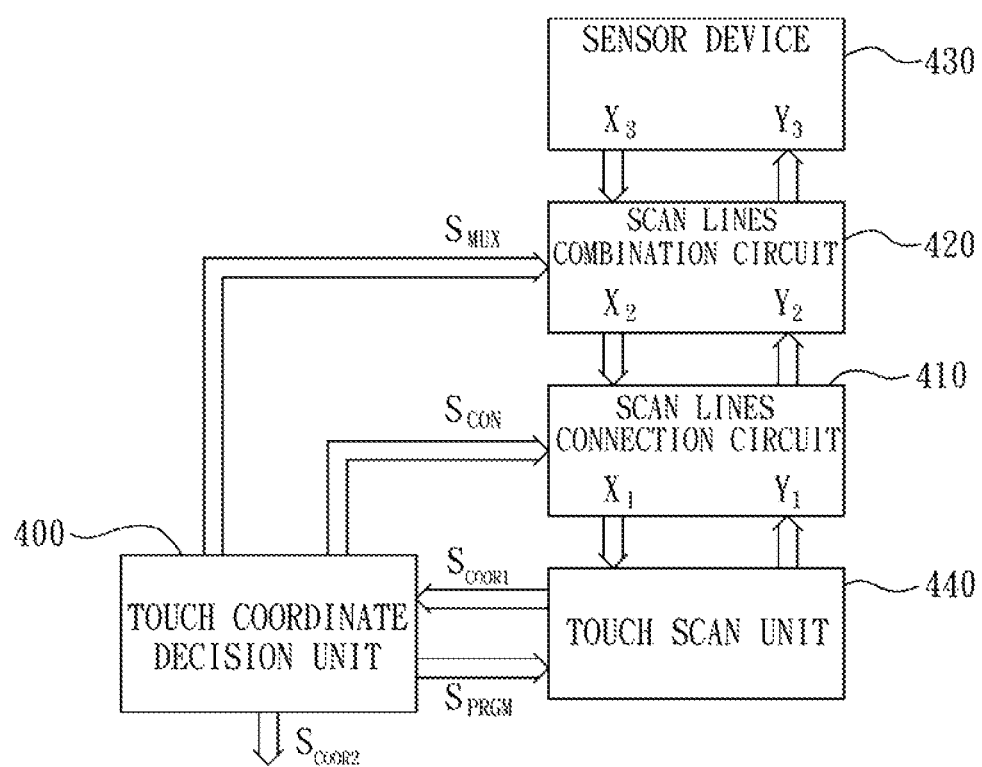
FIG. 4 illustrates the circuit block diagram of another preferred embodiment of the multistage scan touch position detection apparatus of the present invention.

In addition, the circuit of FIG. 3 can be applied to a sensor device having a larger scan size by adding in a scan lines combination circuit. Please refer to FIG. 4, which illustrates a preferred embodiment of the expansion of the circuit of FIG. 3. As illustrated in FIG. 4, the preferred embodiment includes a touch coordinate decision unit 400, a scan lines connection circuit 410, a scan lines combination circuit 420, a sensor device 430, and a touch scan unit 440.

The touch coordinate decision unit 400 has a scan lines combination circuit operation stage and a sub area scan stage, wherein the sub area scan stage has the same operation stages as those disclosed in the specification of FIG. 3. The touch coordinate decision unit 400 is used to: control the scan lines combination circuit 420 through a scan lines combination circuit control signal $S_{MUX}$, to select a touched sub area from a plurality of sub areas of the sensor device 430 in the scan lines combination circuit operation stage, wherein the sub areas have corresponding sub area coordinates; control the scan lines connection circuit 410 through a scan lines connection control signal $S_{CON}$, to define equivalent resolution distributions of a sub area of the sensor device 430 for the operation stages; determine the coordinate spaces of the touch scan unit 440 in the operation stages by a resolution programming signal $S_{PRGM}$; receive interim touch coordinates generated by the touch scan unit 440 in the operation stages through a first coordinate signal $S_{COOR1}$; and sum up the sub area coordinate and the interim touch coordinates to form a touch coordinate and output the touch coordinate through a second coordinate signal $S_{COOR2}$.

The scan lines connection circuit 410 is used to form a plurality of connection configurations between scan lines $X_2$ and scan lines $X_1$, and between scan lines $Y_2$ and scan lines $Y_1$, so as to define the equivalent resolution distributions of the sensor device 430 for the operation stages—for example, as mentioned above, the equivalent resolution distributions can be one scan space of (1×1) for the stage 1, one scan space of ($N_1 \times L_1$) for the stage 2, and $N_1 L_1$ scan spaces of ($N_2 \times L_2$) for the stage 3. Besides, the present invention can also define the equivalent resolution distribution of the sensor device 430 as a non-uniform distribution. For example, when in the stage 3, the present invention can define the sub touch plane located in the stage 2 as having equivalent resolution of $N_2 \times L_2$, while make other sub touch planes not located in the stage 2 as having equivalent resolution of $N_1 \times L_1 - 1$, or 1×1, or even as being no scan operation areas or power-shutdown areas.

The scan lines combination circuit 420 is used to connect the scan lines $X_2$ to part of the scan lines $X_3$, and the scan lines $Y_2$ to part of the scan lines $Y_3$, so as to select one of the subareas of the sensor device 430.

The sensor device 430 is an array type touch sensor device, which can be of resistive type, capacitive type, surface acoustic wave type, or electromagnetic type. The sensor device 430 preferably accesses a driving power through the scan lines $Y_3$ and outputs an analog sensor signal through the scan lines $X_3$.

As the sensing principle of the array type touch sensor device is well known and not the focus of the present invention, it will not be addressed further.

The touch scan unit 440 is used to determine the coordinate spaces of the operation stages according to the resolution programming signal $S_{PRGM}$, so as to deliver the driving power through part of the scan lines $Y_1$, and receive the analog sensor signal through part of the scan lines $X_1$. The analog sensor signal is converted to a digital signal by an analog-to-digital converter (not shown in the figure), and the digital signal is then used to generate the interim touch coordinates. After the interim touch coordinates are generated, the touch scan unit 440 will output the interim touch coordinates through the first coordinate signal $S_{COOR1}$.

It is to be noted that, a general high resolution touch display module has to use ICs having large quantity of pins, and the number of the signal traces for external connection on the glass substrate of the high resolution touch display module is also huge, and these are all disadvantageous to manufacture of high resolution touch display modules. However, according to the design disclosed in FIG. 4 of the present invention, the scan lines combination circuit 420 can be implemented with COG (Chip on Glass) process, or directly integrated on a glass substrate (or flexible printed circuit board), and then connect to a major control circuit via a connector means (for example, a flexible printed circuit board). Besides, by using the scan lines combination circuit 420, the high resolution structure can be simplified, and the manufacture cost can be reduced. What is more, by implementing the scan lines combination circuit 420 on the substrate of a sensor device, the number of signal traces for external connection on the substrate of the sensor device can be greatly reduced so that the amount of infected noise can be minimized and the manufacture process can be simplified. In addition, the scan lines assembly model of the scan lines combination circuit 420 can be utilized to support a variety of display sizes and resolutions.

According to the illustration of FIG. 1 through FIG. 3, the present invention further proposes a multistage scan touch position detection method, including the steps of: detecting a touch event with an 1×1 equivalent resolution distribution (step a); detecting a first coordinate with a first equivalent resolution (step b); detecting a second coordinate with a second equivalent resolution on a local area located by the first coordinate (step c); and summing up the first coordinate and the second coordinate to generate a touch coordinate (step d). As the principles of the steps of the method have been disclosed in the foregoing specification, they will not be addressed further.

Besides, in wake of the disclosure of FIG. 4, the present invention further proposes a multistage scan touch position detection method, including the steps of: detecting a touch event of a sensor device with an 1×1 equivalent resolution distribution (step a); scanning the sensor device to locate a touched sub area from a plurality of sub areas, wherein each of the sub areas has a sub area coordinate, and the touched sub area has a touched sub area coordinate (step b); detecting a first coordinate of the touch event on the touched sub area with a first equivalent resolution distribution (step c); detecting a second coordinate of the touch event on a local area of the touched sub area with a second equivalent resolution distribution (step d), and summing up the touched sub area coordinate, the first coordinate, and the second coordinate (step e). As the principles of the steps of the method have been disclosed in the foregoing specification, they will not be addressed further.

According to the foregoing detailed specification, the multistage scan touch position detection mechanism of the present invention not only can change the equivalent resolution distribution of a touched area, but also can shut down the untouched areas—the touch event scanning, analog-to-digital conversion and coordinate calculation are performed only in the touched area, so the touch scanning efficiency can be improved and the operation power consumption can be reduced. Besides, as the scan lines combination circuit of the present invention can be implemented directly in the sensor device, and connect to a major control circuit via a connection means like flexible printed circuit board, the present invention is therefore particularly suitable for touch display modules of large size and high resolution. In addition, the setting of equivalent resolution distribution can bring forth a parallel-connection-of-capacitors effect for a capacitive sensor device, and the effect together with shutting down or decreasing the scan frequency of the untouched areas, and assigning different scan frequencies for different equivalent resolution distributions—that is, frequency hopping—can prevent generating fixed frequency interfering noise, and the odds of erroneous actions can be reduced.

In conclusion, the touch position detection apparatus and method using multistage scan of the present invention can detect a touch position (or touch positions) more efficiently, and reduce: operation power consumption, number of pins of the control IC, electromagnetic interference, and the interference with the display picture. What is more, the apparatus of the present invention is expandable, making it suitable for large size touch display modules. Compared to prior art touch detection means, the present invention possesses superior advantages.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch position detection apparatus using multistage scan, comprising:
   a scan lines combination circuit, used to select a portion of a third group of scan lines for connection with a second group of scan lines, as to select a touched sub area of a sensor device, wherein said third group of scan lines is coupled with said sensor device;
   a scan lines connection circuit, used for controlling the connection configurations between a first group of scan lines and said second group of scan lines according to a scan lines connection control signal, to determine an equivalent resolution distribution of said touched sub area;
   a touch scan unit, used for selecting a portion of said first group of scan lines according to a resolution programming signal for detecting an interim touch coordinate, and outputting said interim touch coordinate through a first coordinate signal; and
   a touch coordinate decision unit, having a scan lines combination circuit operation stage and a sub area scan stage, wherein said sub area scan stage has a plurality of operation stages, said touch coordinate decision unit being used for: determining the status of said scan lines combination circuit control signal and detecting a touched sub area coordinate when in said scan lines combination circuit operation stage; determining the status of said scan lines connection control signal and the status of said resolution programming signal according to said operation stages, and receiving a plurality of said interim touch coordinates through said first coordinate signal detected in said operation stages when in said sub area scan stage; and summing up said touched sub area coordinate and said interim coordinates;

wherein said touch scan unit has different scan frequencies for different operation stages of said plurality of operation stages.

2. The touch position detection apparatus using multistage scan as claim 1, wherein said sensor device is of one type selected from the group consisting of resistive type, capacitive type, surface acoustic wave type, and electromagnetic type.

3. The touch position detection apparatus using multistage scan as claim 1, wherein said equivalent resolution distribution is a uniform distribution or a non-uniform distribution.

4. The touch position detection apparatus using multistage scan as claim 1, wherein said touch scan unit comprises an analog-to-digital converter.

5. The touch position detection apparatus using multistage scan as claim 1, wherein said scan lines combination circuit is directly integrated on a substrate, which is selected from a group consisting of a glass substrate and a flexible printed circuit board, and connected to a control circuit via a connector means.

6. A touch position detection method using multistage scan, comprising the steps of:
    scanning a plurality of sub areas of a sensor device to locate a touched sub area and generate a touched sub area coordinate;
    scanning said touched sub area with a first equivalent resolution distribution to generate a first coordinate of a touch event;
    scanning a local area of said touched sub area with a second equivalent resolution distribution to generate a second coordinate of said touch event, wherein said local area is located by said first coordinate; and
    summing up said touched sub area coordinate, said first coordinate, and said second coordinate;
    wherein said first equivalent resolution distribution is assigned a first scan frequency and said second equivalent resolution distribution is assigned a second scan frequency different than the first scan frequency.

7. The touch position detection method using multistage scan as claim 6, further comprising a step of scanning said sensor device with an 1×1 equivalent resolution distribution.

8. The touch position detection method using multistage scan as claim 6, wherein said first equivalent resolution distribution is a uniform distribution or a non-uniform distribution, and sub areas other than said touched sub area of said plurality of sub areas are operation areas designated for no scanning or power-shutdown areas.

9. The touch position detection method using multistage scan as claim 6, wherein said second equivalent resolution distribution is a uniform distribution or a non-uniform distribution, and areas other than said local area of said touched sub area are operation areas designated for no scanning or power-shutdown areas.

* * * * *